(12) United States Patent
Wolf et al.

(10) Patent No.: US 8,594,290 B2
(45) Date of Patent: Nov. 26, 2013

(54) DESCRIPTIVE AUDIO CHANNEL FOR USE WITH MULTIMEDIA CONFERENCING

(75) Inventors: Tracee L. Wolf, Ossining, NY (US); Andrew L. Schirmer, Andover, MA (US); Jeremy B. Sussman, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 1559 days.

(21) Appl. No.: 12/142,841

(22) Filed: Jun. 20, 2008

(65) Prior Publication Data

US 2009/0316872 A1 Dec. 24, 2009

(51) Int. Cl.
*H04M 3/42* (2006.01)

(52) U.S. Cl.
USPC .................. 379/202.01; 379/207.01

(58) Field of Classification Search
USPC ............ 379/201.01, 207.01, 265.09
See application file for complete search history.

(56) References Cited

U.S. PATENT DOCUMENTS

| 6,442,758 B1 * | 8/2002 | Jang et al. ............... 725/119 |
| 7,653,192 B1 * | 1/2010 | Sylvain ................ 379/202.01 |
| 2009/0094029 A1 * | 4/2009 | Koch et al. ............... 704/246 |

OTHER PUBLICATIONS iLinc, Company Profile Product Descriptions, <http://www.ilinc.com/pdf/company/ilinc-press-kit.pdf> (last visited Jun. 18, 2008).
Cisco, Using Cisco Unified Meeting Place Web Conferencing, <http://www.cisco.com/en/US/products/sw/ps5664/ps5669/products_configuration_guide_chapter09186a0080641ba7.html> (last visited Jun. 18, 2008).
Live Space, Web Junction, <http://www.webjunction.org/do/Navigation; jsessionid=34DBD87EC7632AAC0A1A12EBC1E95743?category=14519> (last visited Jun. 18, 2008).
Saba Centra Live for eMeetings, Company Profile Product Descriptions, <http://www.saba.com/products/centra/details.htm#emeetings> (last visited Jun. 18, 2008).
RadiSys, Media Server Solutions, <http://www.radisys.com/files/solutions/Audio_Conferencing_SolutionSheet.pdf> (last visited Jun. 20, 2008).

* cited by examiner

*Primary Examiner* — Rasha Al Aubaidi
(74) *Attorney, Agent, or Firm* — Cuenot, Forsythe & Kim, LLC (57) ABSTRACT

A computer-implemented method of conducting a multimedia conference can include identifying a participant from a plurality of participants as a descriptive audio participant in the multimedia conference and detecting a state change during the multimedia conference. The method can include correlating the state change with an audio cue and outputting the audio cue to the descriptive audio participant.

20 Claims, 3 Drawing Sheets

DESCRIPTIVE AUDIO CHANNEL FOR USE WITH MULTIMEDIA CONFERENCING

BACKGROUND

The popularity of the Internet has led to the formation of social relationships across wide geographical areas. Increased levels of home based workers and corporate globalization have led to companies employing multiple work sites. In order to facilitate communication between these scattered sites, a wide variety of applications have emerged which support collaborative interactions between geographically separated users. These collaborative tools can include social networking applications, instant messaging (IM) applications, video-conferencing applications, Voice over Internet Protocol (VOIP) applications, media sharing applications, and the like.

Modern conferencing systems can facilitate seamless operation between collaborative applications executing on networked servers, Internet gateways, and the Public Switched Telephone Network (PSTN). Users of these conferencing systems can participate in a visual and/or auditory interaction, exchange text messages, exchange data files, or the like. For example, a conferencing system can communicatively link members of a geographically dispersed design team for a design review. During the conference, team members can view a presentation by a designer, view files from one or more of the participants, share files between team members, and discuss issues concerning the design.

BRIEF SUMMARY OF THE INVENTION

The embodiments disclosed herein relate to multimedia conferencing. One embodiment of the present invention can include a computer-implemented method of conducting a multimedia conference. The method can include identifying a participant from a plurality of participants as a descriptive audio participant in the multimedia conference and detecting a state change during the multimedia conference. The method can include correlating the state change with an audio cue and outputting the audio cue to the descriptive audio participant.

Another embodiment of the present invention can include a computer-implemented method of conducting a multimedia conference. The method can include identifying a first descriptive audio participant and a second descriptive audio participant from a plurality of participants in the multimedia conference. The method can include determining that the first descriptive audio participant is to be notified of state changes of a first type and that the second descriptive audio participant is to be notified of state changes of a second type and detecting a state change during the multimedia conference. The method further can include correlating the state change with an audio cue, selecting which descriptive audio participant is to be notified of the state change according to type, and outputting the audio cue to the selected descriptive audio participant within an audio stream.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed herein relate to multimedia conferencing. During a multimedia conference, particular users may participate in the multimedia conference but be unable to observe the visual content. For example, a participant may be communicatively linked with the conferencing system using an audio only device such as a conventional telephone. In another example, the user may have access to a multimedia device, but not be able to utilize the visual features of the device, e.g., where the participant is visually impaired or simply chooses not to utilize visual features of the device. In other cases, a user may simply wish to receive additional information relating to the circumstances or context of the multimedia conference.

When participating in the multimedia conference, some aspects of the multimedia conference can be difficult to comprehend. For example, visual happenings in the multimedia conference, such as the changing of a slide, the uploading of a document, or the sharing of a desktop would not be knowable or readily discernable by a participant that does not receive visual content or by a participant that receives only audio content. While some available tools such as screen readers, for example, allow some visual content to be accessed by participants, such systems do not convey the circumstances surrounding the changing visual content or the occurrence of other events or state changes that are not audio based.

In accordance with the embodiments disclosed herein, a participant can request the delivery of additional information for a multimedia conference through a descriptive channel. A participant that invokes this feature, referred to as a descriptive audio participant of the multimedia conference, can receive audio cues that indicate the circumstances surrounding state changes in the multimedia conference, e.g., changing visual content. The audio cues can provide the descriptive audio participant with meta-data relating to the multimedia conference. As used herein, meta-data can refer to information describing content of the multimedia conference. For example, meta-data, being distinguished from the content itself, can specify a slide number for a slide presently being viewed in the multimedia conference as opposed to the content or text within the slide.

Tools, such as text to speech and screen reader applications, attempt to resolve some of these issues by converting displayed text to a synthesized voice that can be played to multimedia conference participants. The generated speech, however, can overlap with the audio of the multimedia conference, which effectively obscures the audio of the multimedia conference. Further, both screen readers and text to speech applications fail to provide information regarding the circumstances of the changing visualizations or state during the multimedia conference.

Figure 1:
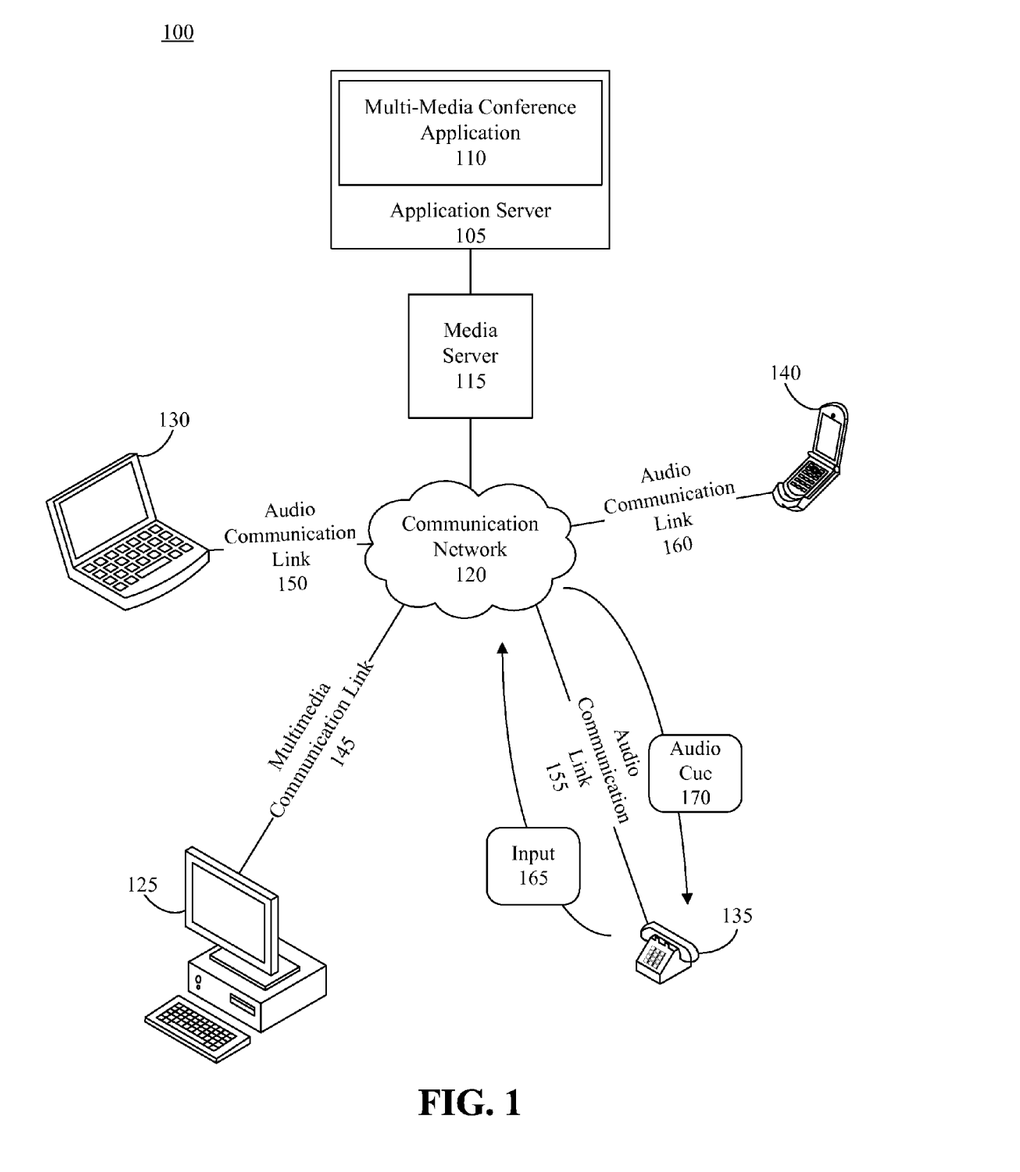
FIG. 1 is a block diagram illustrating a system for multimedia conferencing in accordance with one embodiment of the present invention.

FIG. 1 is a block diagram illustrating a system 100 for multimedia conferencing in accordance with one embodiment of the present invention. The system 100 can include an application server 105 and a media server 115. The application server 105 and the media server 115 each can be implemented as any of a variety of data processing systems.

A data processing system can store and/or execute program code for performing the various functions described herein. Each data processing system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The application server 105 can execute a multimedia conference application 110 (hereafter "conference application"). The conference application 110 can implement program logic that allows the application server 105 to control the media server 115 to implement a multimedia conference (hereafter "conference"). The application server 105, executing the conference application 110, can send commands to the media server 115. The commands can instruct the media server 115 as to the particular functions to be performed to establish, maintain, and terminate a conference. For example, the media server 115, under the control of the application server 105, can join participants to the conference, route audio, visual, and/or multimedia streams to selected participants, disconnect participants from the conference, or the like.

The media server 115 further can perform functions such as speech recognition upon received voice data from a participant, recognize dual tone multi-frequency input received from the participant, receive textual data, play or output recorded audio to one or more participants, and/or generate text-to-speech audio to be played or output to one or more participants. Data obtained, or derived, from participants by the media server 115, e.g., speech recognized text, numerical data determined from DTMF signals, other keyboard entry data, or the like can be passed from the media server 115 to the application server 105, for use by the conference application 110. The application server 105 can process the received data and issue appropriate commands to the media server 115 in accordance with the conference application 110.

Each participant in a conference can utilize a communication node (node), such as nodes 125, 130, 135, and/or 140, to communicate with the media server 115. Each node 125-140 can be communicatively linked with the media server 115 via the communication network 120. Examples of nodes can include, for example, conventional telephones utilizing Plain Old Telephone Service (POTS), computers, mobile phones, wireless enabled personal digital assistants, other data processing systems, or the like. It should be appreciated that some nodes may communicate both audio and visual content, e.g., establish a multimedia communication link carrying a multimedia stream, while other nodes may only establish audio communication links that carry audio streams. Those devices that may only establish audio communication links may be referred to as "audio-only" nodes. It should be appreciated that a node capable of establishing a multimedia communication link may be considered to be, or operate as, an audio-only node from time to time as will be described in this specification.

The communication network 120 can be implemented as, or include, without limitation, a WAN, a LAN, the PSTN, the Web, the Internet, and one or more intranets. Communication network 120 further can be implemented as, or include, one or more wireless networks, whether short or long range. For example, in terms of short range wireless networks, the communication network 120 can include a local wireless network built using a Bluetooth or one of the IEEE 802 wireless communication protocols, e.g., 802.11a/b/g/i/n, 802.15, 802.16, 802.20, Wi-Fi Protected Access (WPA), or WPA2. In terms of long range wireless networks, the communication network 120 can include a mobile, cellular, and or satellite-based wireless network and support voice, video, text, and/or any combination thereof, e.g., GSM, TDMA, CDMA, and/or WCDMA network.

Throughout this specification, reference will be made to participants and nodes. It should be appreciated that as each participant must communicate through a node, any reference to a participant refers to the identity of the participant and the particular node through which the participant is communicating. Similarly, a reference to a node will reference the identity of the participant communicating through, or with, that node.

In operation, each of nodes 125-140 can join and participate in a conference hosted by system 100 via communication links 145-160 respectively. Each of nodes 125-140 can be remotely located from one another, e.g., whether in different rooms or buildings, 10-20 feet from one another, or within different cities or countries. As pictured, node 125 can communicate with system 100 via a multimedia communication link 145. A multimedia communication link can refer to an established communication link that carries a multimedia stream, e.g., both audio content or data and visual content or data. For example, node 125 can communicate over an Internet Protocol (IP) connection using client software that facilitates the exchange of both audio and video data over the multimedia communication link 145.

As used within this specification, the term "data stream" can refer to digital data being transmitted over a communication channel, analog signals being transmitted over a communication channel, or both. An audio stream can include only audio content or data. A video data stream can include only video content or data. A multimedia stream can include both audio and visual content or data.

The term "channel," as used herein, is used to refer to content. For example, an audio channel can refer to audio content of the conference itself, e.g., the voices of participants, audio played by participants, sounds captured by transducers such as microphones within nodes, and the like. A multimedia channel can refer to both audio and visual content or data of the conference, e.g., visual data of participants (video), slides presented, participant voices, etc. The descriptive audio channel can refer to audio cues that specify additional or supplemental information relating to a conference that have been requested as a feature by one or more participants. For example, the descriptive audio channel can refer to content that is added and not inclusive of participant voices or other audio triggered by a participant.

Thus, within this specification, a particular communication link may carry an audio channel and a descriptive audio channel. Similarly, a communication link may carry a multimedia channel and a descriptive audio channel. The term channel is not intended to imply any particular type of encoding or communication technology. The channels may be encoded and sent in the form of multiple, independently encoded channels or data streams or blended or mixed into a single channel or data stream prior to being sent from the media server 115 to the various nodes 125-140.

Node 130 can communicate with system 100 via an audio communication link 150. For example, node 130 may communicate using a client that supports only audio communications over an IP connection. Node 135 can communicate with system 100 via an audio communication link 155, e.g., a POTS line. Node 140 can communicate with the system 100 via an audio communication link 160 carried over a mobile network. Alternatively, node 140 may be equipped to communicate with system 100 via a multimedia communication link. Thus, nodes 130, 135, and 140 may receive an audio channel for the conference and, if requested, a descriptive audio channel via each respective audio communication link 150, 155, and 160. In the case where node 140 communicates via a multimedia communication channel similar to node 125, then each may receive a multimedia channel of the conference as well as a descriptive channel if requested.

It should be appreciated that the particular number and/or type of nodes and the communication links over which each node communicates with system 100 are provided for purposes of illustration only. Fewer or more nodes may be included. Further, different nodes may establish different types of communication links at different times.

During the conference established between nodes 125-140, the participant using node 135 can send a user input 165 to system 100. In this example, the input 165 can be one or more DTMF signals played responsive to the user of node 135 selecting keys on the keypad of node 135. It should be appreciated that other types of nodes will be capable of sending different types of inputs, e.g., voice, text, keyboard, pointer entry data, or the like. Input 165 can identify node 135 as a descriptive audio node or a descriptive audio participant by requesting delivery of additional information for the multimedia conference through a descriptive audio channel.

In this example, node 135 is not capable of receiving and/or processing visual data. In other cases, a node can identify itself as a descriptive audio node when audio cues, as described in this specification, are desired by the user despite the capability of the node being able to communicate over a multimedia channel during the conference. For instance, a user may be communicating over a multimedia channel, but be driving and desire audio cues as the user is unable to pay attention to visual content. In that case, the user, through the user's node, can send a user input identifying himself or herself as a descriptive audio participant.

The media server 115 can receive the input 165 and, if necessary, format the input 165 to a form usable by the application server 105. For example, in the case of received DTMF signals, the media server 115 can convert such signals into alphanumeric data and provide the converted data to the application server 105. The alphanumeric data received by the application server 105 can be correlated with a command in the conference application 110. Accordingly, the application server 105, responsive to receiving the converted data, can identify node 135 as a descriptive audio node, e.g., by virtue of the received alphanumeric data. The application server 105 can begin detecting state changes occurring during the conference.

Responsive to detecting a state change during the multimedia conference, the application server 105 can correlate the detected state change with an audio cue, e.g., audio cue 170. The application server 105 can instruct the media server 115 to play audio cue 170 to node 135 responsive to detecting the correlated state change. For example, responsive to identifying node 135 as a descriptive audio node, the application server 105 can determine that the particular visual or slide being presented to multimedia participants of the conference, e.g., those receiving visual data, has changed. Accordingly, responsive to detecting the changing of the slide, e.g., a state change, the application server 105 can correlate the state change with audio cue 170. The application server 105 can instruct media server 115 to play audio cue 170 to node 135 via a descriptive audio channel which can be provided to node 135. The audio cue 170 can indicate or state that the slide has been changed. For example, audio cue 170 may be prerecorded audio such as "slide advanced." In another embodiment, the audio cue 170 can be specified by the application server 105 by sending text to be converted to speech by the media server 115. In the latter example, the audio cues can be highly customized according to various parameters identified or associated with each detected state change.

In one embodiment, a set of associations can be created and stored between each participant input and various commands in the conference application 110. The associations may be system wide or vary, e.g., be unique, for different users or nodes. For example, participant "A" can associate the "star" key to a command identifying participant A as a descriptive audio participant. Participant "B," can associate the "pound" key with the command identifying the user as a descriptive audio participant. Accordingly, these associations can be account specific, e.g., where each user has an established account allowing customization of commands for invoking descriptive audio participant status.

In one embodiment, media server 115 can buffer the various data streams provided to nodes 125-140. In another embodiment, only audio streams that are to be provided to descriptive audio participants may be buffered. Buffering data streams allows the media server 115 to perform various other functions such as inserting audio cues in particular locations in a data stream, e.g., within a detected pause, so as not to create a data stream to node 135 where the audio cues obscure the underlying audio of the conference.

Figure 2:
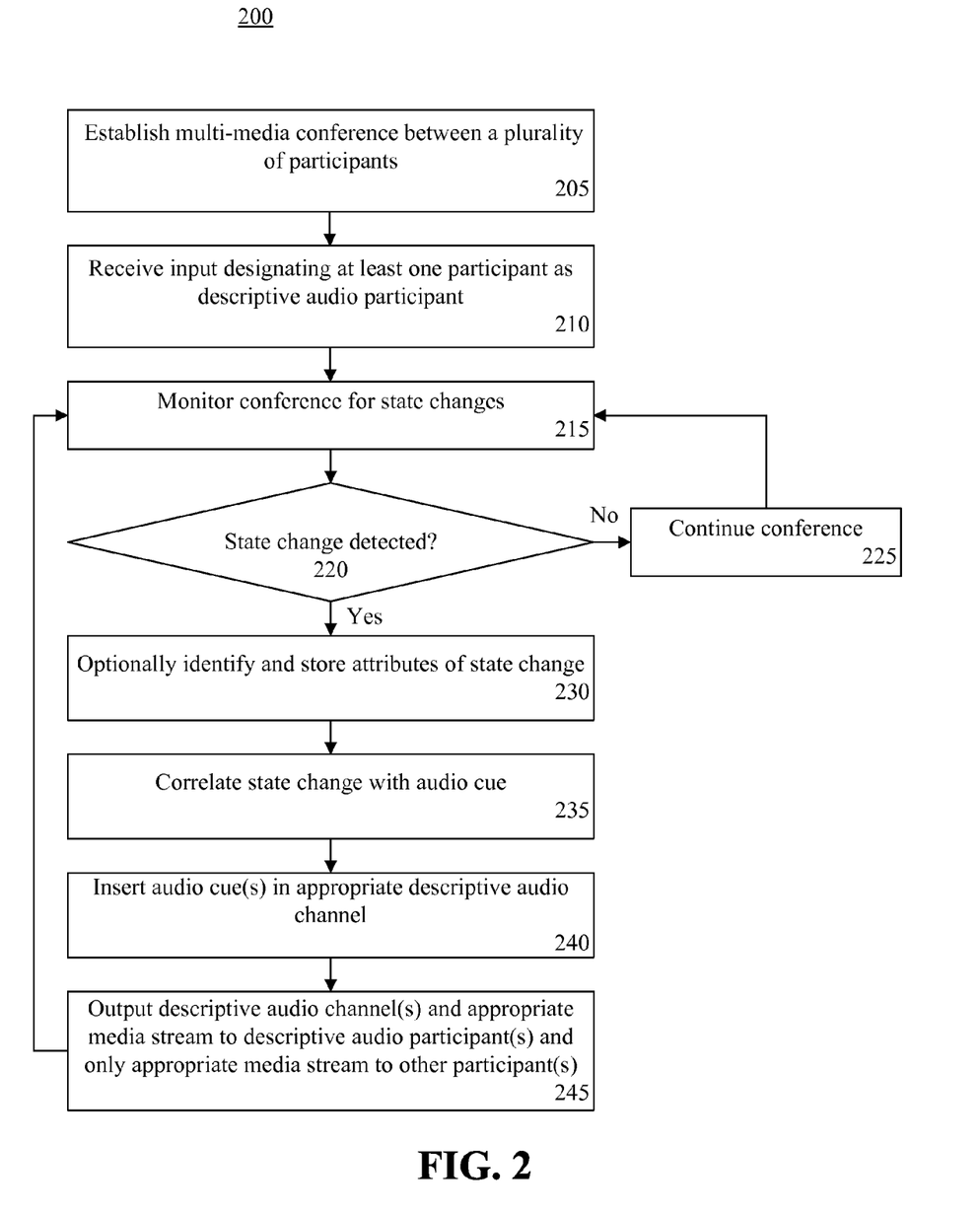
FIG. 2 is a flow chart illustrating a method of multimedia conferencing in accordance with another embodiment of the present invention.

FIG. 2 is a flow chart illustrating a method 200 of multimedia conferencing in accordance with another embodiment of the present invention. The method 200 can be implemented using a system as described with reference to FIG. 1 or any other system with the same or similar functionality.

Accordingly, in step 205, a conference can be established between a plurality of participants. The plurality of participants of the conference may each be connected via a multimedia channel of the conference, an audio channel of the conference, or some combination of multimedia channel(s) and audio channel(s) where one or more participants are connected via a multimedia channel of the conference while one or more other participants are connected via an audio channel of the conference. In some cases, as noted, participants receiving multimedia conference may not be able to pay attention to, or interact with the visual content, and therefore, rely primarily upon the audio content of the multimedia channel. For example, a sight impaired employee can monitor the conference at a workstation which can receive a multimedia channel of the conference. The employee, however, may only interact with the audio content of the conference. It should be appreciated that whether connected to the conference via a multimedia channel or an audio channel, a participant also may receive the descriptive audio channel described within this specification.

In step 210, the system can receive an input designating a participant in the conference as descriptive audio participant. For example, the participant can press a "pound" key on a mobile telephone belonging to the participant. When the system receives the user input requesting descriptive audio participant status for the node, the system can begin monitoring for state changes. As noted, the designation of the participant as a descriptive audio participant is not limited to participants using audio only devices or participants connected via an audio channel. Participants connected to the conference via a multimedia channel also may be designated as descriptive audio participants if that status is so requested.

Additional participant inputs can be used to select other functionalities of the system. In one embodiment, the participant can select which state changes, e.g., which type of state changes, the participant will be alerted to by the system. The participant can be given a menu of commands, with each command designating one or more unique state changes about which the participant will be notified. For example, pressing the "1" key can enable the system to alert the participant each time a participant joins or leaves the conference. An input of "2" can request audio cues indicating the changing of slides. An input of "3" can request audio cues indicating the uploading of a file. Other inputs can specify various combinations of different state changes or notification of all detected state changes.

In step 215, the system can monitor the conference for a state change. Examples of state changes can include, but are not limited to, interactions with files used in the conference such as the uploading of a file to the system, the downloading of a file from the system, or the sharing of a file between participants in the conference, the joining of a new participant to the conference, the exit of a participant from the conference, the identification of a geographical location of a participant in the conference, identification of a change of conference speaker, changes to the conference agenda, the changing of visual content being presented during the conference, a user input causing or invoking some programmatic action, any other non-audio event and/or activity related to the conference.

In step 220, the system can determine whether a state change has been detected. If so, the method 200 can proceed to step 230. If not, the method 200 can proceed to step 225. It should be appreciated that the particular state changes that are detected can be only those that participants have selected for notifications. Any state changes that are not to be correlated with an audio cue to be sent to a participant, as specified by received requests for descriptive audio participant status from conference participants, can be ignored.

In another embodiment, each type of state change that can be detected by the system may be detected and stored along with any attributes relating to the detected state change. In this manner, a log of state changes can be maintained and stored. In that case, only those state changes for which participants have requested audio cues can be further processed and correlated with audio cues. Those state changes for which participants have not requested notifications, e.g., audio cues, can be stored for purposes of creating the log.

In step 225, the conference can continue with each participant receiving the particular channel associated with that participant, whether audio or multimedia. For example, no audio cues will be inserted into the media streams or be sent via the descriptive audio channel. The method 200 can return to step 215 to continue monitoring for state changes.

In step 230, the system optionally can identify and store attributes of the detected state change. The identified attributes of a detected state change can be stored along with a time stamp for the occurrence of the state change and the participant responsible for initiating the state change, if applicable. As noted, a wide variety of collaborative activities during the conference can be considered a state change. One or more attributes can be identified from the state change and used to determine a subset or sub-class of the particular state change. The determination of the subset or sub-class can result in differing courses of action for each subset or sub-class of the particular state change, e.g., correlation of the detected state change to a different audio cue.

For example, when a new participant, "Bob," joins a conference, the system can detect this event as a new participant state change. Further, the system can identify attributes such as the identity of the joining participant and the location of the participant, for example, where a user profile is available to the system with location information. The identified attributes can be associated with the detected state change and used to select, or correlate, the state change with a particular audio cue.

In addition, when a state change is detected, the particular participant that requested notification of that state change event can be identified. Identification of the participant allows the system to insert the audio cue into the correct descriptive audio channel depending upon which participant(s) requested audio cues for the detected type of event, e.g., select the particular descriptive audio channel that is provided to the participant that requested notifications of the detected event.

In step 235, the detected state change can be correlated with an audio cue. In one embodiment, the state change can be correlated with an audio cue through a mapping of audio cues and state changes. Any attributes identified by the system also can be used to select a particular audio cue or subset of audio cues. For example, the state change event can be correlated with an audio cue saying "someone has joined the conference." When additional information such as the identity of the person and the various other attributes are determined, those attributes may be incorporated into the audio cue or used to select a more detailed audio cue. For example, when the identity of the user that has joined the conference is known, the audio cue can be "Bob from Denver has joined the conference." In another example, the audio cue can be "Bob has advanced the slide from slide 1 to slide 2" where the attributes can include the prior slide number, the new slide number, and the identity of the participant that initiated the slide change.

In step 240, the audio cue can be inserted into the descriptive audio channel of the descriptive audio participant identified in step 210. Were the audio cue to be randomly inserted into the descriptive audio channel, comprehension issues may result for the descriptive audio participant since the audio cue may overlap with sound occurring on the audio and/or multimedia channel of the conference that is also being delivered to the descriptive audio participant. For example, a speaker in the conference can utter the sentences "This graph shows customer acceptance of the new product. As we can see, the plot is ascending exponentially." A pause may exist between the first and second sentences. Further, the speaker can change the visual display of the conference to a new slide as the first sentence is uttered. The state change referring to the slide change can be detected by the system and correlated to the audio cue "now viewing slide 6." In this case, the audio cue may be generated responsive to detecting the audio event, e.g., while the first sentence is spoken. Upon insertion of the audio cue into the descriptive audio channel, the audio cue may overlap with the sounds of the first spoken sentence within the audio channel. Thus, the insertion of the audio cue into the descriptive audio channel can make the audio channel, or the audio portion of the multimedia channel, difficult for the descriptive audio participant to comprehend.

In one embodiment, the system, e.g., the media server, can perform functions such as buffering the audio stream (whether of the audio channel or the audio portion of the multimedia channel), searching the audio stream for a pause, and inserting the audio cue into the descriptive audio channel during the detected pause in the audio or multimedia channel. Buffering of the audio stream can allow the audio stream to be monitored until a pause of sufficient length can be identified in which to insert the audio cue in the descriptive audio channel, or play the audio cue. Upon identifying the pause, the audio cue can be inserted into the descriptive audio channel, or played, at a time coincident with the identified pause in the audio channel or the multimedia channel.

Using the preceding example, the system can monitor the audio stream of the audio or multimedia channel being delivered to the descriptive audio participant and identify the pause between the two spoken sentences "This graph shows customer acceptance of the new product" and "As we can see, the plot is ascending exponentially." Responsive to determining that the pause within the audio stream between the two sentences is at least as long as the length of the audio cue to be inserted, so that no overlap occurs between the audio cue and the audio of the audio or multimedia channel, the audio cue "now viewing slide 6" can be inserted into the descriptive audio channel at a location or time that coincides with the detected pause. In this manner, overlap between the audio stream of the conference and the audio cue, e.g., content of the descriptive audio channel, can be prevented.

When the location of the pause occurs at a point in time too distant from the time of the detected state change, the contextual connection between the audio cue and the state change in the presentation may be lost. In order to facilitate the insertion of the audio cue into the descriptive audio channel in a timely manner, the audio stream of the audio or multimedia channel and/or the audio cue can be processed to allow timely insertion or playing of the audio cue. In one embodiment, the buffered audio stream can be processed to create a pause or expand an identified pause, thereby providing space for the insertion of the audio cue into the descriptive audio channel. In this manner the audio cue can be inserted into the descriptive audio channel, or played, in a timely manner, maintaining the contextual connection between the audio cue and the conference subject matter. If a larger pause is created for insertion of the audio cue, the audio stream being provided to the descriptive audio participant can be played back at a faster rate, e.g., a rate faster than normal playback speed, so that the playback of the buffered audio stream catches up to the real time audio stream of the conference after the audio cue is played.

In another embodiment, a pause can be created or inserted in the audio channel, or within the audio portion of the multimedia channel, where none previously existed. For example, if a pause is not detected within a predetermined period of time after the detected state change, a pause can be inserted into the audio channel or the audio portion of the multimedia channel. In another embodiment, if a pause is not detected within a predetermined amount of time of the detected state change, e.g., one, two, or three seconds, an alternative technique can be used, e.g., lowering the volume of the audio channel or the audio portion of the multimedia channel and inserting the audio cue into the descriptive audio channel, or playing the audio cue at a volume that is higher than the audio channel so as to distinguish the audio cue from the conference audio content.

Further, if the identified pause is of insufficient length to accommodate the audio cue, the length of the audio cue can be decreased such that the audio cue can be inserted into the descriptive audio channel during the identified pause without the audio cue overlapping the audio content of the conference. For example, the audio cue can be played back at a higher speed, thereby decreasing the length, e.g., time, of the audio cue. In another embodiment, the volume of the conference can be decreased during the playback of the audio cue. In this manner, the audio cue can be clearly discerned over the audio content of the conference. It should be noted that each of the preceding techniques can be implemented independently or in combination with one another.

In step 245, the descriptive audio channel and the appropriate type of channel, e.g., audio channel or multimedia channel, can be output to the descriptive audio participant while participants that are not descriptive audio participants can continue to receive their respective channels for the conference. As used herein, "output" or "outputting" can include, but is not limited to, storing data in memory, e.g., writing to a file, writing to a user display or other output device, e.g., playing audible notifications, sending or transmitting to another system, exporting, or the like.

In one embodiment, buffering of the audio stream provides a delay capability that enables features such as replay and/or audio processing of the buffered audio stream. For example, a participant can press the "star" key of a mobile telephone, which causes the system to initiate the playback of the audio channel from a selected section of the conference. If visual content is buffered, the multimedia channel also may be played back from a selected time within the conference. This allows the participant to review, e.g., listen to and/or watch, the selected section of the conference. In addition, participant inputs to the audio only or multimedia device can invoke operations on, text to speech translations of presentation documents, the audio stream of the conference, and audio cues that have been buffered. For example, participant inputs can invoke the reading of the conference agenda, fast forward through the audio channel or multimedia channel, playback a text to speech translation of a file, turn off audio cues, or the like.

It should be noted that each participant can select a unique set of programmable features which affect the output to the participant. As a result, the output to each participant can be a unique audio mix reflecting the programming selection implemented by each participant. For example, in the same period of time a first participant can receive a playback of a previous ten minutes of the audio stream of the multimedia conference with no audio cues, while a second participant may receive the real time audio stream of the conference with all audio cues enabled. Further, each descriptive audio participant can receive only those audio cues that he or she has requested. Thus, while the method of FIG. 2 has been described with reference to a single descriptive audio participant, the process can be implemented with multiple descriptive audio participants where the system detects state changes, correlates those state changes with particular descriptive audio participants, and further correlates the state changes with audio cues to be played within a descriptive audio channel for each respective and correlated descriptive audio participant.

Figure 3:
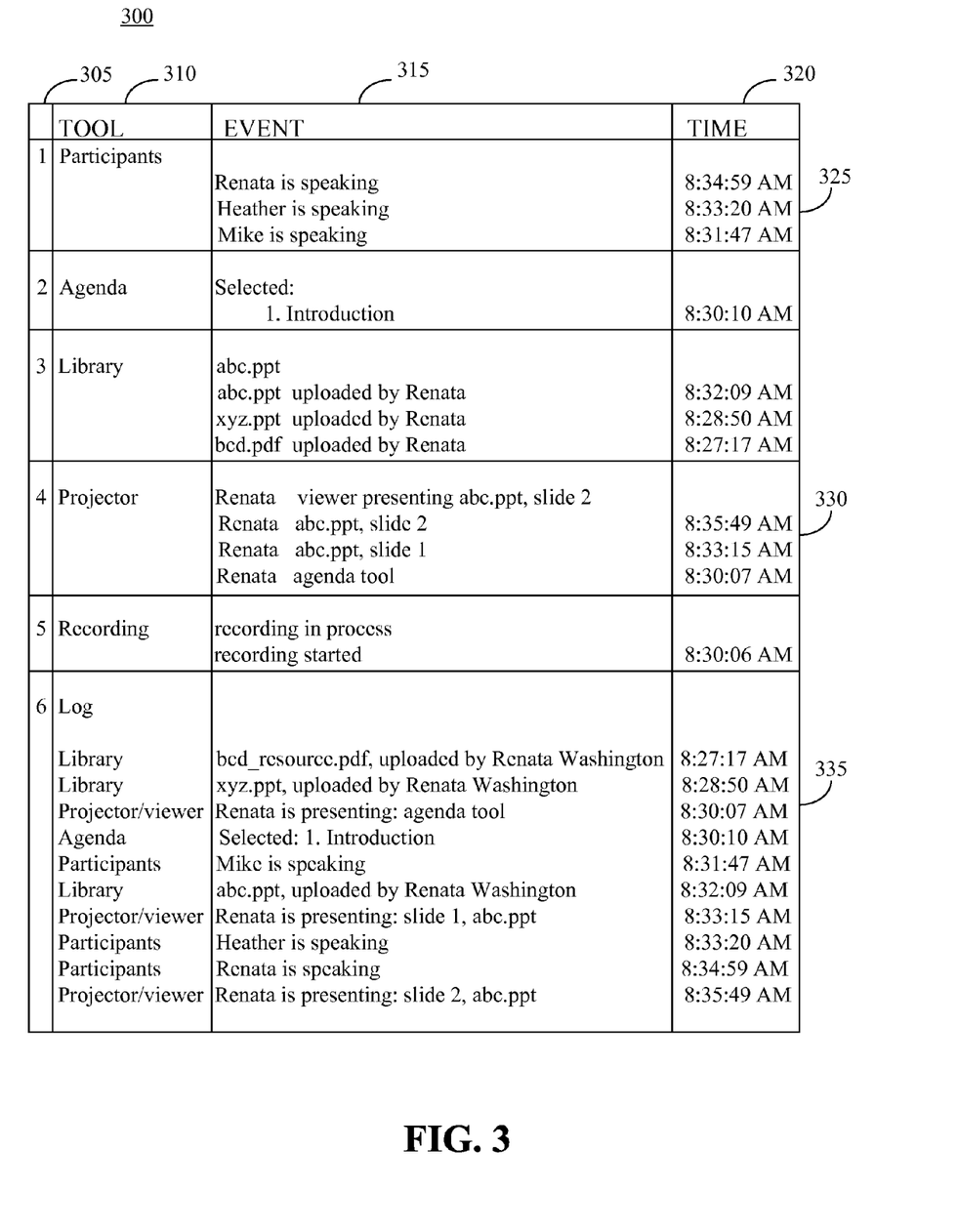
FIG. 3 is an illustration of a transcript of a multimedia conference in accordance with another embodiment of the present invention.

FIG. 3 is an illustration of a transcript 300 of a multimedia conference in accordance with another embodiment of the present invention. The transcript 300 can be generated from a multimedia conference conducted as described herein with reference to FIGS. 1-2. As described in FIG. 2, the transcript 300 can be created from state change information that is stored responsive to detection during the multimedia conference. The transcript 300 can present a log including a time and an initiator of each state change as well as a conference tool, e.g., conference application, being used during the state change. The transcript 300 can be accessed by participants in the conference via any type of communication node. The transcript can be provide a record of the multimedia conference, accessible to all users whether descriptive audio participants or not, and independent of the attendance of the user at the conference.

The transcript 300 can include columns 305, 310, 315, and 320. Input column 305 can list each input digit with which the participant may select a function for accessing information contained within the transcript 300. Tool column 310 can list each tool function available to the participant to access various information types available within the transcript 300. Event column 315 can list each state change that may occur during the conference. Time column 320 can list a time that each state change occurred during the conference. Each row in the log can represent a category of state changes or a tool through which a state change may occur. For example, participant row 325 lists all speaking related state changes, while row projector 330 lists all state changes related to the projector tool.

Responsive to a participant input, information from the transcript 300 can be provided to the participant. In the case of a descriptive audio participant, the contents of the transcript 300 can be provided to the participant via the descriptive audio channel. For example, a media server can insert a text to speech translation of the transcript 300 into an audio stream provided to the audio only device of the participant. Still, the transcript 300 can be provided to multimedia participants via one or both of visual and auditory modalities. For example, the transcript 300 can be provided to a multimedia participant graphically via a display device or, as with the descriptive audio participant, via the descriptive audio channel.

A user accessing the transcript 300 can input any of the digits listed in input column 305 in order to access information based on the categories listed in tool column 310. For example, the user can input the digit "1" from a communication node. The system can generate an audio output of the information contained in participant row 325. Participant row 325 can contain information relating to each participant related state change, the participant performing the state change, and the time of the state change. In another example, the participant can input the digit "6" and access the information in a log row 330. Log row 330, for example, can include a log of each state change that occurred during the multimedia conference. The information contained in log row 330 can be translated from text to speech and output to the user's communication node.

The transcript 300 can provide a real time log of state changes, allowing users to review past conference activities. In this manner, the user, whether a participant of the conference or not, can become aware of, for example, conference documents to be reviewed, relevant sections of document(s) accessed during the conference, sections of the conference of interest to the user for playback, participants involved in the conference, or the like.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of conducting a multimedia conference, comprising:
   designating one or more participants, from a plurality of participants, with a descriptive audio participant status as a descriptive audio participant in the multimedia conference;
   detecting a state change during the multimedia conference;
   correlating the state change with an audio cue; and
   outputting the audio cue only to the one or more participants designated with the descriptive audio participant status and not one or more participants from the plurality of participants not designated with the descriptive audio participant status.

2. The computer-implemented method of claim 1, wherein the outputting the audio cue comprises:
   detecting a pause within an audio stream of the multimedia conference provided to the one or more participants designated with the descriptive audio participant status;
   inserting the audio cue within a descriptive audio channel at a location corresponding to the pause in the audio stream; and
   outputting the descriptive audio channel to the one or more participants designated with the descriptive audio participant status.

3. The computer-implemented method of claim 1, further comprising
   receiving a request, from a participant in the multimedia conference, for the descriptive audio participant status.

4. The computer-implemented method of claim 3, further comprising
   selecting the input to be a dual-tone multi-frequency signal.

5. The computer-implemented method of claim 1, further comprising:
   receiving a participant input requesting play back of a portion of the audio stream of the multimedia conference; and
   playing back the portion of the audio stream while the conference continues in real time.

6. The computer-implemented method of claim 1, wherein the detected state change during the multimedia conference is a change in visual content of the multimedia conference.

7. The computer-implemented method of claim 1, wherein the detected state change during the multimedia conference is an operation on a file during the multimedia conference.

8. The computer-implemented method of claim 1, wherein the detected state change during the multimedia conference is a change in at least one attribute of the detected state change.

9. The computer-implemented method of claim 1, wherein the detected state change during the multimedia conference is a change of participants in the multimedia conference.

10. The computer-implemented method of claim 1, further comprising
storing a transcript of state changes detected during the multimedia conference.

11. A computer-implemented method of conducting a multimedia conference, the method comprising:
identifying a first descriptive audio participant and a second descriptive audio participant from a plurality of participants in the multimedia conference;
determining that the first descriptive audio participant is to be notified of state changes of a first type and that the second descriptive audio participant is to be notified of state changes of a second type;
detecting a state change during the multimedia conference;
correlating the state change with an audio cue;
selecting which descriptive audio participant is to be notified of the state change according to type; and
outputting the audio cue to the selected descriptive audio participant within a descriptive audio channel.

12. The computer-implemented method of claim 11, further comprising receiving an input from the first descriptive audio participant requesting notification of state changes of the first type.

13. A computer program product comprising a computer usable storage device having stored therein computer usable program code for conducting a multimedia conference, the computer usable program code, which when executed by a computer hardware system, causes the computer hardware system to perform:
designating one or more participants, from a plurality of participants, with a descriptive audio participant status as a descriptive audio participant in the multimedia conference;
detecting a state change during the multimedia conference;
correlating the state change with an audio cue; and
outputting the audio cue only to the one or more participants designated with the descriptive audio participant status and not one or more participants from the plurality of participants not designated with the descriptive audio participant status.

14. The computer program product of claim 13, wherein the outputting the audio cue comprises:
detecting a pause within an audio stream of the multimedia conference provided to the one or more participants designated with the descriptive audio participant status;
inserting the audio cue within a descriptive audio channel at a location corresponding to the pause in the audio stream; and
outputting the descriptive audio channel to the one or more participants designated with the descriptive audio participant status.

15. The computer program product of claim 13, wherein the computer usable program code further causes the computer hardware system to perform
receiving a request, from a participant in the multimedia conference, for the descriptive audio participant status.

16. The computer program product of claim 15, wherein the computer usable program code further causes the computer hardware system to perform
selecting the input to be a dual-tone multi-frequency signal.

17. The computer program product of claim 13, wherein the detected state change during the multimedia conference is a change in visual content of the multimedia conference.

18. The computer program product of claim 13, wherein the detected state change during the multimedia conference is an operation on a file during the multimedia conference.

19. The computer program product of claim 13, wherein the detected state change during the multimedia conference is a change of participants in the multimedia conference.

20. The computer program product of claim 13, wherein the computer usable program code further causes the computer hardware system to perform
storing a transcript of state changes detected during the multimedia conference.

* * * * *